Patented Feb. 29, 1944

2,342,991

UNITED STATES PATENT OFFICE 2,342,991

PRODUCTION OF LOW TEMPERATURES

Helen L. Wikoff, Columbus, Ohio

No Drawing. Application January 29, 1941,
Serial No. 376,549

10 Claims. (Cl. 252—70)

The present invention relates to the production of low temperatures by a system which is essentially characterized by the employment of essentially non-volatile organic solvent substances in association with a suitable solid refrigerating agent, such for example as "Dry Ice," i. e. solid carbon dioxide preferably in the form now readily available on the market. In the most advantageous form of the invention, use is made only of non-volatile organic solvents which are capable of being solidified or crystallized in the presence of a sufficient quantity of refrigerant of the character of solid carbon dioxide or "Dry Ice." The resultant cooled, essentially liquid admixture, with the non-volatile solvent at the point of incipient freezing, is then used as a cooling bath, total solidification of the mass being prevented by avoiding a large excess of solid refrigerant.

There is a definite need for many purposes, and more particularly in connection with research work in biological chemistry where many of the recent advances depend upon the use of low temperatures ranging from —20° to —76° C., for a system in which these low temperatures can be obtained without the use of a so-called "cold room," which generally is not available to the average chemist. The desiderata of such a system are that it should (a) provide an inexpensive method and means for obtaining low temperatures, preferably on an ordinary laboratory table, (b) that the realizable temperatures should remain substantially constant for appreciable time intervals, and (c) that neither health hazards nor fire hazards should be involved in the production of the cold.

It is of course, broadly old to produce low temperatures. Thus, with proper insulation and a good compressor system, temperatures ranging between —35° and —40° C. may be obtained by the use of liquid ammonia, and if liquid carbon dioxide is substituted for ammonia in the cooling system, temperatures between —51° and —56° C. are possible. Still greater compression by means of a booster makes it possible to produce a temperature of approximately —84.5° C. used for making "Dry Ice" from carbon dioxide. However, the cost of installing the apparatus required makes these methods for the production of low temperatures relatively expensive so that they are practically out of the question for the small chemical laboratory.

Liquid air enables one to obtain temperatures of about —140° C., but here again costly apparatus is needed to produce the liquid air, and very special care is necessary in handling the material after it has been manufactured. The result is that liquid air plays practically no part in the production of low temperatures, for example, for general biological work.

Similarly, cold rooms, operated at a minimum temperature of —20° to —25° C. and designed primarily for storage purposes, are sometimes used in biological work but, though ideal for cold storage purposes, are scarcely suitable places in which to work. Individuals who must enter and leave a cold room at frequent intervals are apt to become careless about proper warmth in dress, and pneumonia may be contracted during a hot summer season by a research worker using such a cold room. On the other hand, if workers are properly dressed to protect themselves against the cold, their ability to manipulate delicate chemical apparatus is greatly hampered by gloves and extra clothing. Moreover, the cost of the installation of such rooms is high so that only a limited number thereof are in operation.

Temperatures ranging from —50° to as low as —75° C. have been realized, after the lapse of a considerable period of time, by the expedient of adding "Dry Ice" to certain highly volatile organic solvents such as ethyl alcohol and the like. This method is not at all satisfactory for practical purposes, since the use of volatile solvents of this character constitutes a hazard to health and is also a distinct fire hazard.

It is evident from the foregoing that the state of the prior art, as above summarized, does not satisfy the existing need for the aforementioned system of producing low temperatures.

The primary purpose of the present invention therefore, is to obviate the deficiency of the state of the prior art and to provide a simplified and inexpensive system which will fully satisfy the aforesaid need and which will fulfill the above-outlined desiderata. Moreover, it is a purpose of the invention to provide a system which, in addition to the described advantages, will also possess other advantages as will be apparent from the following disclosure.

Briefly stated, the essential concept upon which the system for the production of low temperatures according to the present invention is based, is the use of a non-volatile organic substance in association with a solid refrigerant such as solid carbon dioxide ("Dry Ice"). More specifically, the preferred and most advantageous form of the invention, particularly wherein the low temperature to be produced is to be constant in character, is based upon conversion of a non-volatile organic solvent into a solid by means of the admixture therewith of solid carbon dioxide or other suitable refrigerating agent. In this respect, the invention utilizes the fact that there is a specific freezing point or low temperature magnitude to which each mixture of solvent and solid refrigerant, such as "Dry Ice," goes. This low temperature is then maintained especially constant for a long period of time by taking advantage of the latent heat of fusion of the solidified or crystallized solvent, i. e. the amount of heat required to convert the solidified material at the low temperature to the liquid form at the same temperature. The object of the present invention is realized as a result of the circumstance that the temperature of the mixture will not rise until all the solidified solvent has been converted into liquid. The function of the solid refrigerant per se is to lower the temperature so that the organic solvent will assume the solidified, frozen or crystallized state. Total solidification of the admixture is prevented by avoiding a large excess of refrigerant.

In short, the means for producing low temperatures according to the preferred and most advantageous form of the present invention is, in effect, a suspension of solidified non-volatile organic solvent in liquid organic solvent (i. e. the same organic solvent) which is saturated with a refrigerant such as solid carbon dioxide. The solution is kept saturated by adding a slight excess of the solid refrigerant. It is the changing of the non-volatile organic solvent from the solid to the liquid state which maintains the constant temperature, since there is no change in the temperature of the mixture until all the solidified non-volatile organic solvent is changed back to liquid state. The length of time necessary for this change to take place may be prolonged by employing a suitable insulation.

It has heretofore been extremely difficult and impracticable to maintain temperatures below $-70°$ C. for any considerable period of time. However, as will hereinafter appear, the present invention makes this possible in relatively easy manner even when the specific solvent and refrigerant used are of a character as to render impractical the realization of an actual suspension of solidified non-volatile organic solvent in the said solvent in liquid form. In the latter event, solid carbon dioxide is preferably added until the presence of an excess thereof causes no further reduction in temperature after standing for several hours.

*Illustrative procedure*

Low temperatures may be obtained according to this invention, for example in containers of suitable capacity (e. g. 1000 cc. "Thermos" brand vacuum—insulated containers made of "Pyrex" glass and covered, if desired, with a further insulating layer of cotton or other suitable insulating material, the containers being supported if desired, in copper jackets provided with lids and handles) by slowly adding 115–170 grams (4 to 6 ounces) of "Dry Ice," in small pieces, to about 500 cc. of the non-volatile liquid used. The solid carbon dioxide or "Dry Ice" is preferably added slowly to prevent the liquid from being splattered out of the container by too rapid an evolution of $CO_2$. The temperature is thus lowered appreciably within a few minutes and further additions of "Dry Ice" may then be made with little danger of splattering.

It is of course possible to use large containers such as are available on the market in the form, for example, of 4,300 cc. and 41,371 cc. capacity, in which case correspondingly greater quantities of non-volatile solvent and solid refrigerant are used. The 4,300 cc. capacity container, for example, is large enough to accommodate a 1-liter Erlenmeyer flask, while the larger container will accommodate much larger vessels.

*Character of the non-volatile organic substances*

It has been found that the non-volatile organic substances fall generally into three groups with respect to behavior to "Dry Ice":
1. Compounds which crystallize sharply from solutions with carbon dioxide, i. e. which solidify;
2. Compounds which thicken and either supercool or fail to crystallize at all; and
3. Compounds which neither crystallize nor thicken to any extent.

Compounds of the second type are not preferred for the purposes of the present invention since a thickened cooling bath is not readily utilizable. Compounds of the first type are best suited for the present invention and will maintain a substantially constant temperature slightly lower than the initial temperature of crystallization for a considerable period of time. Compounds in the third group tend to approach $-79.5°$ C., the melting point of solid carbon dioxide.

Illustrative of the compounds of the first type are a preferred group of substances which are characterized by a capacity to crystallize sharply from solutions with carbon dioxide, namely, ethylene glycol, dimethoxytetraethylene glycol, diethyl carbitol and carbitol acetate.

Illustrative of another group of substances which come within the scope of the present invention but which are not as advantageous as the afore-enumerated substances, since they are not characterized by sharp crystallization from solutions with carbon dioxide, are, for example, Cellosolve, Cellosolve acetate, diacetone alcohol and butyl Cellosolve.

It is possible with the first-named substances to obtain a substantially constant temperature, that is, a temperature $\pm 1$ to $2°$ C. for a considerable period of time. The second-named group of substances does not give quite as constant a temperature as the first-named group, although temperatures constant to $\pm 4°$ C. for a considerable period of time are realizable therewith.

*Table of preferred products*

| Name of product | Temperature produced, °C. (with solid carbon dioxide) |
|---|---|
| Ethylene glycol | $-15 \pm 1$ |
| Dimethoxytetraethylene glycol | $-31 \pm 1$ |
| Diethyl carbitol | $-52 \pm 1$ |
| Carbitol acetate | $-67 \pm 2$ |
| Cellosolve | |
| Cellosolve acetate | |
| Diacetone alcohol | $-73$ to $-77$ |
| Butyl cellosolve | |

Considering these products more specifically: Ethylene glycol, which crystallizes from carbon dioxide solution at $-15°$, neither thickens nor supercools. If the Dry Ice is added carefully so as to avoid the presence of a large excess after reaching a temperature of $-15°$, most of the ethylene glycol can be kept in solution and a constant temperature of $-15° \pm 1°$ C. can be maintained for at least four hours without even closing the container.

Dimethoxytetraethylene glycol begins to crystallize from a solution saturated with carbon dioxide at —29° C. By carefully avoiding a large excess of "Dry Ice," a temperature of —31°±1° C. can be maintained for at least six hours without adding more ice or causing more than a small amount of crystallization at room temperature of 30° C.

The carbitol series appears to be the safest for use in the production of cold with "Dry Ice," since none of the compounds investigated possesses a vapor pressure greater than 0.8 mm. of mercury.

Diethyl carbitol was found to crystallize from carbon dioxide solution at —54° C. without supercooling or thickening before crystallization. By adding the "Dry Ice" cautiously to this compound so as to avoid a large excess at the crystallization temperature, only a small amount of solution will crystallize and the remainder will maintain a temperature of —52° for at least four hours.

The carbitol acetates have been found to be particularly useful for producing extreme cold with "Dry Ice." Carbitol acetate, which crystallizes at —73° C. from a water-thin carbon dioxide solution, may be used for baths of —67° by avoiding too large an excess of "Dry Ice."

The Cellosolve series of compounds may also be used to produce even lower temperatures, according to this invention. Thus, with Cellosolve itself a low temperature ranging from —76° to —77° C. may be reached. Cellosolve and butyl Cellosolve which have vapor pressures of 3 and 0.97 mm. of mercury, respectively, are particularly suitable for maintaining temperatures of —74° to —77° over long periods of time if a supply of "Dry Ice" sufficient to lower the temperature to this magnitude is employed.

In actual practice, it has been found more convenient to use a series of graded low-temperature baths than to place a warm object at once into a container with a bath of an extremely low temperature. The latter practice will generally result in the violent evolution of carbon dioxide together with a possible loss of part of the cooling fluid. Such a series of baths can be obtained, for example, by using any one of the second hereinbefore-named specific group of substances in admixture with a varying amount of "Dry Ice."

An important feature of the present invention is that the same fluid may be used many times by simply adding "Dry Ice" whenever a low temperature is desired. If convenient, the solvents may be left in the small "Thermos" containers which may be closed by corks after the contents have returned to room temperature. When the solvent must be removed from the container, a violent evolution of carbon dioxide together with a possible loss of part of the fluid may occur if the cold mixture is poured directly into a bottle, beaker, or other container at room temperature, and caution must therefore be exercised in this regard.

The term "Dry Ice," as herein employed, refers to solid carbon dioxide; the name "diethyl carbitol" refers to the diethyl ether or diethylene glycol corresponding to the formula $$(C_2H_5OCH_2CH_2)_2O$$

the name "carbitol acetate" refers to the monoethyl ether of diethylene glycol acetate corresponding to the formula $$CH_3COOCH_2CH_2OCH_2CH_2OC_2H_5$$

the name "Cellosolve" refers to the monoethyl ether of ethylene glycol corresponding to the formula $$C_2H_5OCH_2CH_2OH$$

the name "Cellosolve acetate" refers to the monoethyl ether of ethylene glycol acetate corresponding to the formula $CH_3COOCH_2.CH_2OC_2H_5$; and the name "butyl Cellosolve" refers to the mono n-butyl ether of ethylene glycol corresponding to the formula $C_4H_9O.CH_2CH_2OH$.

The expression "non-volatile solvent," as herein employed refers to normally liquid substances of the character hereinbefore enumerated and having a vapor pressure of the order of less than 3 mm. of mercury and, preferably, of the order of about 0.8–1.0 mm. of mercury, at the low temperature of use according to this invention.

It will be apparent from the foregoing specific disclosure that ways and means of realizing the initially-outlined desiderata are provided by the present invention.

What is claimed is:

1. A composition of the character described particularly adapted for the production and maintenance for a considerable period of time of a substantially constant low temperature of the order of —79.5° C., which comprises a substantially non-volatile, normally liquid organic substance in solid phase in suspension in the said organic substance in liquid phase, said liquid phase being saturated with and containing a slight undissolved excess of solid carbon dioxide, said organic substance having a vapor pressure of the order of 3 mm. of Hg or less at the said temperature.

2. A constant low-temperature bath consisting essentially of a saturated solution of carbon dioxide in a substantially non-volatile, normally liquid organic substance in liquid phase, said solution containing a slight excess of carbon dioxide in solid form, said organic substance having a vapor pressure of the order of 3 mm. of Hg or less at the said temperature.

3. A constant low-temperature bath consisting essentially of a saturated solution of carbon dioxide in a substantially non-volatile, normally liquid organic substance in liquid phase, said solution containing a slight excess of carbon dioxide in solid form, said organic substance having a vapor pressure of the order of 1 mm. of Hg or less at about —79.5° C.

4. A constant low-temperature composition consisting essentially of a suspension of a relatively small quantity, in solid phase, of a substantially non-volatile, normally liquid organic substance which is characterized by the presence of the ethylene glycol radical in the said organic substance, in liquid phase, said liquid phase being saturated with respect to carbon dioxide and containing undissolved solid carbon dioxide therein, said organic substance having a vapor pressure of the order of 3 mm. of Hg or less at the said temperature.

5. A constant low-temperature composition consisting essentially of a suspension of a relatively small quantity of ethylene glycol in solid phase in a carbon dioxide-solution of liquid ethylene glycol which is saturated with respect to the carbon dioxide and which contains a small quantity of undissolved solid carbon dioxide therein.

6. A constant low-temperature composition consisting essentially of a suspension of a relatively small quantity of a diethyl ether of diethylene glycol in solid phase in a carbon dioxide-solution of liquid diethyl ether of diethylene glycol which is saturated with respect to the carbon dioxide and which contains a small quantity of undissolved solid carbon dioxide therein.

7. A constant low-temperature composition consisting essentially of a suspension of a relatively small quantity of dimethoxytetraethylene glycol in solid phase in a carbon dioxide-solution of liquid dimethoxytetraethylene glycol which is saturated with respect to the carbon dioxide and which contains a small quantity of undissolved solid carbon dioxide therein.

8. The method of producing a substantially constant low-temperature medium particularly adapted to maintain a constant low-temperature of the order of $-79.5°$ C. for a considerable period of time, which comprises dissolving solid carbon dioxide in a substantially non-volatile, normally liquid organic substance in liquid phase until an excess of the solid carbon dioxide produces no reduction in temperature after standing for several hours, said organic substance having a vapor pressure of the order of 3 mm. of Hg or less at the said temperature.

9. The method of producing a substantially constant low-temperature medium particularly adapted to maintain a constant low-temperature of the order of $-79.5°$ C. for a considerable period of time, which comprises dissolving solid carbon dioxide in a substantially non-volatile, normally liquid organic substance in liquid phase until incipient crystallization of the said organic substance takes place, and thereafter discontinuing the addition of solid carbon dioxide as soon as slight excess thereof in undissolved form is present, said organic substance having a vapor pressure of the order of 3 mm. of Hg or less at the said temperature.

10. The method of maintaining a constant low temperature of the order of $-79.5°$ for a considerable period of time, which comprises precipitating a substantially non-volatile, normally liquid organic substance in solid form from the said substance in liquid phase by incorporating solid carbon dioxide in slight excess thereinto, and allowing the precipitated solid to reconvert gradually from the solid phase to the liquid phase in the presence of such slight excess, said organic substance having a vapor pressure of the order of 3 mm. of Hg or less at the said temperature.

HELEN L. WIKOFF.